United States Patent
Shirakura et al.

(10) Patent No.: US 8,384,619 B2
(45) Date of Patent: Feb. 26, 2013

(54) GRAPHIC METER DISPLAY

(75) Inventors: Junya Shirakura, Shizuoka (JP);
Kazuyoshi Ogasawara, Shizuoka (JP)

(73) Assignee: Yazaki Corporation, Tokyo (JP)

(*) Notice: Subject to any disclaimer, the term of this patent is extended or adjusted under 35 U.S.C. 154(b) by 1173 days.

(21) Appl. No.: 11/783,649

(22) Filed: Apr. 11, 2007

(65) Prior Publication Data

US 2008/0018597 A1 Jan. 24, 2008

(30) Foreign Application Priority Data

May 10, 2006 (JP) .................. 2006-130987

(51) Int. Cl.
*G06F 3/033* (2006.01)
(52) U.S. Cl. .............. 345/24; 345/23; 345/29; 345/156; 345/644; 348/416.1; 715/856
(58) Field of Classification Search .............. 345/33, 345/157, 156; 348/416, 439, 699, 111, 68; 715/856

See application file for complete search history.

(56) References Cited

U.S. PATENT DOCUMENTS

| | | | |
|---|---|---|---|
| 5,613,048 A | 3/1997 | Chen et al. | 395/119 |
| 5,982,440 A * | 11/1999 | Aoki | 375/240.16 |
| 2004/0075749 A1 * | 4/2004 | Kondo et al. | 348/222.1 |
| 2005/0212669 A1 * | 9/2005 | Ono et al. | 340/461 |
| 2007/0285388 A1 * | 12/2007 | Ogasawara | 345/157 |

FOREIGN PATENT DOCUMENTS

| | | |
|---|---|---|
| DE | 195 30 419 | 2/1997 |
| JP | 2002-15335 | 1/2002 |
| JP | 2003-233828 | 8/2003 |
| JP | 2003-262542 | 9/2003 |
| WO | WO 99/54850 | 10/1999 |

OTHER PUBLICATIONS

ST 387-85, Chevrolet Corvette Shop Manual, 1985, Front Page and pp. 8C-1 and 8C-2.*
http://cgi.ebay.com/ebaymotors/85-89-CORVETTE-DIGITAL-DASH-CLUSTER-TACH-LED-LCD-NEW-/280358319783.*
Nao Mishima et al.: "Novel Frame Interpolation Method for Hold-Type Displays", 2004 International Conference on Image Processing, vol. 3, pp. 1473-1476.
"LCD mit 200 Hertz-Sony revolutionert das Fernsehen", URL: http://home-entertainment.magnus.de/tv-beamer/artikel/lcd-mit-200-hertz.html, 3 pages.

* cited by examiner

*Primary Examiner* — Lun-Yi Lao
*Assistant Examiner* — Olga Merkoulova
(74) *Attorney, Agent, or Firm* — Kratz, Quintos & Hanson, LLP

(57) ABSTRACT

When switching a motion blur pointer image to a normal pointer image, an intermediate pointer image is displayed between the motion blur pointer image and the normal pointer image. The intermediate pointer image is a rectangle, and coordinates of vertexes of the rectangle are composed of coordinates of vertexes of the motion blur pointer image and the next normal pointer image.

3 Claims, 3 Drawing Sheets

GRAPHIC METER DISPLAY

CROSS REFERENCE TO RELATED APPLICATIONS

This application is on the basis of Japanese Patent Application No. 2006-130987, the contents of which are hereby incorporated by reference.

BACKGROUND OF THE INVENTION

1. Field of the Invention

The present invention relates to a graphic meter display for a vehicle for displaying driving data by graphically displaying a dial plate and a pointer using such as a dot matrix type LCD.

2. Description of the Related Art

Japanese Published Patent Application No. 2003-262542 discloses one of a conventional graphic meter display. When the pointer on the graphic meter display is moved rapidly, many pointer images are shown as after-images. Therefore, an object of this graphic meter display is to solve the problem, and prevents a viewer from feeling a sense of incompatibility. For solving the problem, the graphic meter display displays a shadow opposed to a moving side of the pointer when a moving speed of the pointer is over a predetermined value.

Such a display technique is called a "motion blur" technique for displaying a rapidly moving object by canceling after-images, and disclosed in Japanese Published Patent Application No. 2002-15335 and No. 2003-233828.

In the graphic meter displays, the motion blur is suitable for the rapidly moving pointer. However, when the pointer moves slowly or stops moving, for surely displaying a value (speed, revolutions per minute or the like) indicated by the pointer, naturally, the pointer should be displayed as a normal pointer image. Therefore, it is necessary to switch between the motion blur display and a normal display.

Thus, the motion blur display is used when the moving pointer cannot be visible, and when the pointer can be visible, the display is switched to the normal display. Therefore, there is a gap between the motion blur display and the normal display at a predetermined moving speed.

Therefore, at a switching timing, the viewer sees the motion blur display and the normal display at the same time for a moment, and sees the gap between the motion blur and normal displays to feel the sense of incompatibility.

Accordingly, an object of the present invention is to provide a graphic meter display having an improved display mode for switching from a motion blur display to a normal display to prevent a viewer from feeling a sense of incompatibility.

SUMMARY OF THE INVENTION

In order to attain the object, according to the present invention, there is provided a graphic meter display for displaying a moving pointer on a dial plate, wherein when a moving speed of the pointer is equal to or more than a specific value, the display displays a motion blur pointer image, when the moving speed is less than the specific value, the display displays a normal pointer image, and when the motion blur pointer image is switched to the normal pointer image, an intermediate pointer image generated from the motion blur pointer image and the normal pointer image is displayed between the motion blur pointer image and the normal pointer image.

Preferably, the intermediate pointer image is a rectangular image pattern generated from position data of ends of the motion blur pointer image and the normal pointer image facing each other.

Preferably, the intermediate pointer image is overlapped with none of the motion blur pointer image and the normal pointer image.

These and other objects, features, and advantages of the present invention will become more apparent upon reading of the following detailed description along with the accompanied drawings.

DETAILED DESCRIPTION OF THE PREFERRED EMBODIMENTS

Next, an embodiment of a graphic meter display according to the present invention will be explained with reference to figures. In this embodiment, the graphic meter display is used in a meter for a vehicle.

Figure 1:
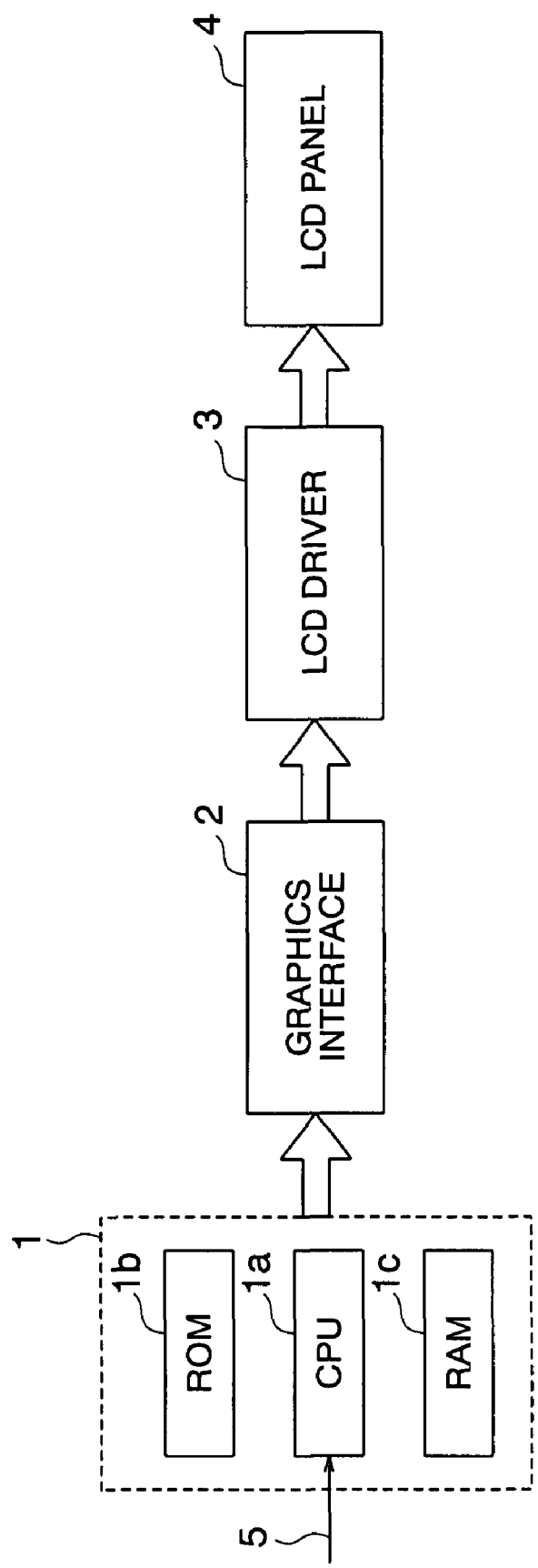
FIG. 1 is a system block diagram of a meter for a vehicle using an embodiment of a graphic meter display according to the present invention.

In FIG. 1, the meter of this embodiment is composed of a microcomputer 1, a graphic interface 2, an LCD driver 3, and an LCD panel as a graphic display. The microcomputer 1 includes a CPU 1a for executing various controls and processes according to a predetermined program, a ROM 1b storing such as the program for the CPU 1a, a RAM 1c for providing a working area for CPU 1a. The ROM 1b previously stores a still image of a substantially circular dial plate and a plurality of pointer images having position coordinates corresponding to rotation angles of a rotating pointer on the dial plate. The ROM 1b also stores a threshold value for comparing a rotation speed.

The microcomputer 1 generates various images based on various detecting signal of the vehicle through a data bus 5, and sends the images to the LCD panel 4 via the graphic interface 2 and the LCD driver 3. Then, the microcomputer 1 displays images of a speedometer, a tachometer, a fuel mater, and the like. Incidentally, in the following explanations, a rotating meter for displaying engine revolutions will be explained.

A still image of a substantially circular dial plate is displayed on the LCD panel 4, and a moving image of a pointer rotating corresponding to the engine revolutions is displayed on a graduations of the dial plate. The dial plate is, for example, displayed as an image having white graduations and numbers with a black background, and the pointer is, for example, displayed as a red image. The pointer image is switched at every unit time T0 (=1/60 (sec)) with a rotation value (angle) sampled at every unit time T0. The RAM 1c stores the latest rotation value, and the pointer image is displayed based on the previously sampled rotation value. Because the display switching timing is 1/60 sec and very short, a displaying delay of one unit time from the real time data is not recognized by a viewer.

When the pointer image is displayed, a difference of the position coordinates (rotation speed of the pointer) is calculated based on an angular difference of the pointer between the latest and the last time rotation values, and the pointer image is selected or calculated based on the rotation speed of the pointer. Namely, when the rotation speed is less than a threshold value, a normal pointer image is selected, and when the rotation speed is equal to or more than the threshold value, the motion blur pointer image is calculated. Further, when the motion blur pointer image is switched to the normal pointer image, an intermediate pointer image is calculated based on the rotation angle of the after-switched normal pointer image and the last time motion blur pointer image. Then, as shown in a flowchart of FIG. 2, the image is switched at every unit time. This display is called "drawing" in the process of the CPU 1a.

Figure 2:
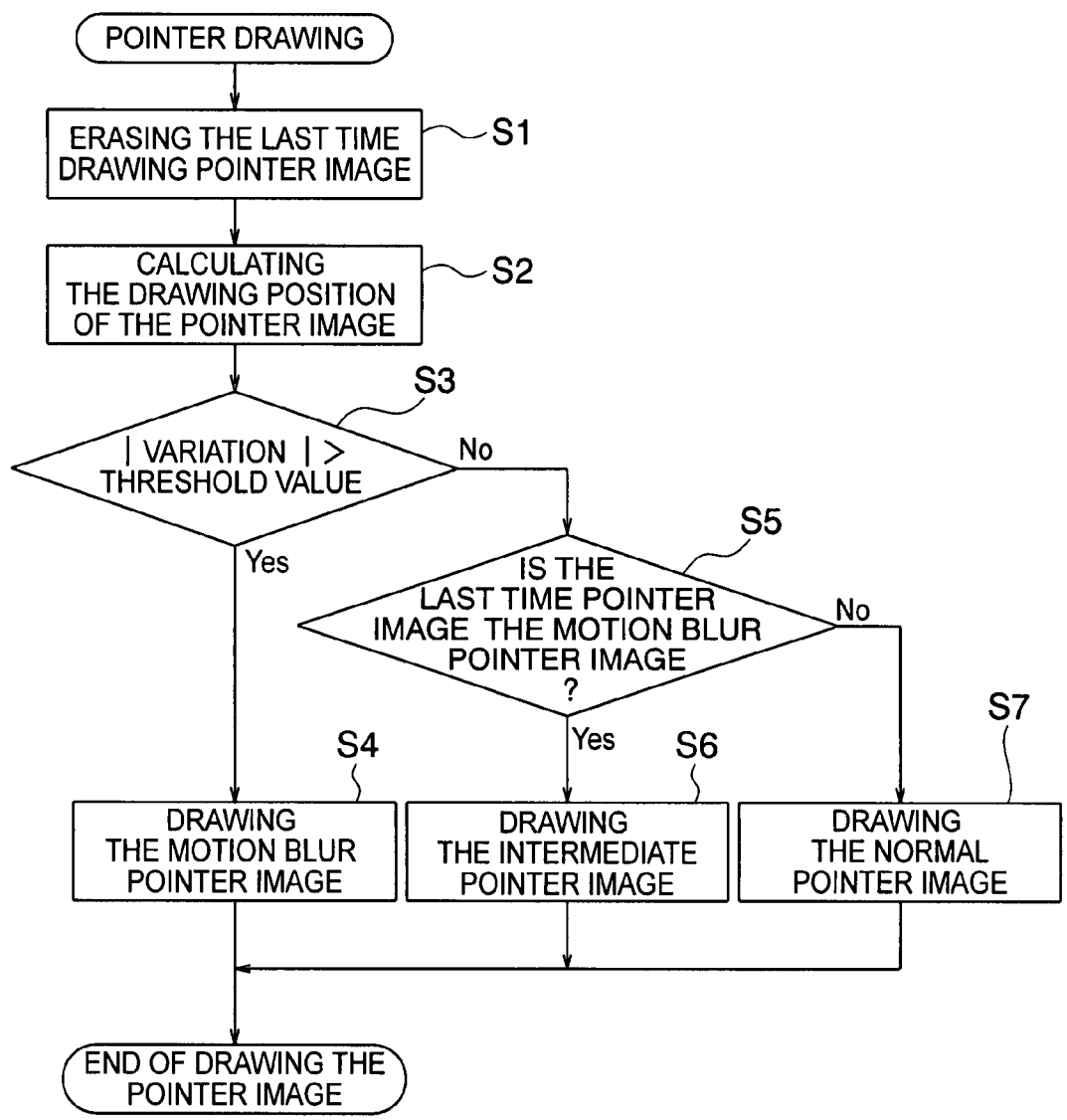
FIG. 2 is a flowchart explaining a display control process of the meter for a vehicle.

A flowchart of FIG. 2 is a pointer drawing process subroutine. The process is executed by inputting a rotation value corresponding to a rotation speed of an engine at every unit time T0 using a main processing and a timer interrupt. First, the CPU 1a erases the last time drawing pointer image (normal, intermediate, or motion blur pointer image) at step S1, then calculates a drawing position of the latest pointer image at step S2. Next, at step S3, a variation is calculated based on a difference between the last time and the latest rotation values, and judges whether an absolute value of the variation is equal to or more than the threshold value. If the absolute value is equal to or more than the threshold value, the motion blur pointer image is drawn at step S4, and the process returns to step S1.

When the absolute value is less than the threshold value at step S3, the CPU 1a judges whether the last time pointer image is the motion blur pointer image or not at step S5. If the last time pointer image is the motion blur pointer image, the later-described intermediate pointer image is drawn at step S6, and the process returns to step S1. If the last time pointer image is not the motion blur pointer image, the normal pointer image is drawn at step S7, and the process returns to step S1.

Figure 3A:
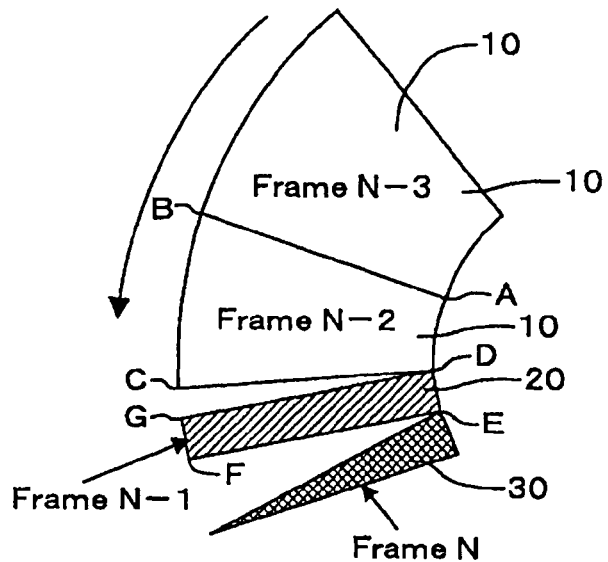
FIGS. 3A and 3B are views showing display examples of the meter for a vehicle.
Figure 3B:
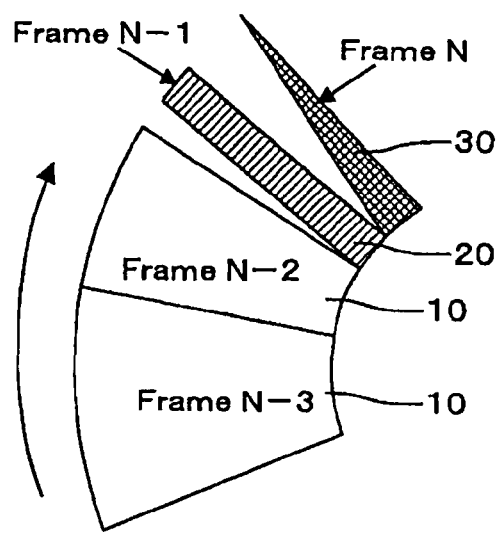

According to the above process, for example, displays shown in FIGS. 3A and 3B are displayed. FIG. 3A shows the display in a case that the engine revolution is rapidly decreased, and FIG. 3B shows the display in a case that the engine revolution is rapidly increased. The last frame is Frame N, the last but one frame is Frame N-1, and the last but two frame is Frame N-2. In FIG. 3, Frame N-3 and Frame N-2 are the motion blur pointer images 10. Frame N-1 is the intermediate pointer image 20. Frame N is the normal pointer image 30.

For example, coordinates of points A, B in the motion blur pointer image 10 of Frame N-2 is calculated based on the rotation value of the pointer at the last timing before the timing of drawing the motion blur pointer image. Coordinates of points C, D in the motion blur pointer image 10 is calculated based on the rotation value of the pointer at the timing of drawing the motion blur pointer image. Thus, a sector-shaped motion blur pointer image having vertexes A, B, C, D is drawn.

Coordinates of a point E in the intermediate pointer image 20 of Frame N-1 is calculated based on the rotation value of the pointer at the timing of displaying the intermediate pointer image 20. Coordinates of points F, G are calculated by parallel translation of the point E and already calculated point D. The intermediate pointer image 20 is drawn as a rectangle having vertexes D, E, F, G. The normal pointer image 30 of Frame N is drawn by data previously stored in the ROM 1b corresponding to the rotating position of the pointer.

Thus, the intermediate pointer image is drawn based on the already-calculated points D and E, and is a simple rectangle. Therefore, generating the intermediate pointer image 20 is not a heavy load for the CPU 1a. Further, in this embodiment, the motion blur pointer image 10 is a sector. However, if the motion blur pointer image 10 is a simple trapezoid having vertexes A, B, C, D, a load for generating the motion blur pointer image 10 is also reduced. Incidentally, if the CPU 1a has enough power, the intermediate pointer image 20 may fully connect the motion blur pointer image 10 and the normal pointer image 30.

The intermediate pointer image 20 never overlaps with any one of the motion blur pointer image 10 and the normal pointer image 30, no overlap of afterglow exists on the display screen and the images emit light evenly.

If the motion blur pointer image 10 or the intermediate pointer image 20 has transparency toward an outer periphery from a center of the dial plate, the images look more realistic. However, for reducing the load of the process, plane color images are better.

In the above embodiment, whether switching the motion blur pointer image to the intermediate pointer image and whether switching the normal pointer image to the motion blur pointer image are judged by comparing the rotation speed with the threshold value. However, it is acceptable that two threshold values are used for the comparison and a hysteresis characteristic is added. In this case, a first threshold value is used for switching the motion blur pointer image to the intermediate pointer image, and the second threshold value is used for switching the normal pointer image to the motion blur pointer image.

In the above embodiment, the engine revolution indicator for a vehicle with the graphic meter display is explained. However, the speedometer also can use the graphic meter display.

In the above embodiment, an LCD is used as a graphic display device. However, an Organic EL display, a Plasma display, or the like can be used.

In the above embodiment, the graphic meter display is used for a vehicle meter. However, the graphic meter display may be used for other meters.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A graphic meter display system for displaying, a moving pointer on a dial plate to indicate driving data for a vehicle, comprising
   a graphic meter display;
   a microcomputer; and
   a controller for controlling the graphic meter display in accordance with instructions from the microcomputer,
   wherein the graphic meter display consecutively displays pointer images corresponding with angle position coordinates of the pointer, the pointer images following each other in equal time intervals,
   wherein each angle position coordinate corresponds to a value of the driving data, and a motion speed of the pointer corresponds to a rate of change of the angle position coordinates over the period of one of the tune intervals,
   wherein the respective pointer image is displayed as a blur pointer image if the motion speed of the pointer according to the change of position coordinates of consecutive angle positions is bigger than a threshold value, and the respective pointer is displayed as a normal pointer image if the motion speed of the pointer according to the change of the position coordinates of consecutive angle positions is smaller than the threshold value, characterized by displaying, when the display of the blur pointer image is changed to the display of the normal pointer image, an intermediate pointer image comprising a geometric figure which is different from the geometric figure of the blur pointer image and the geometric figure of the normal pointer image in the time interval between the display of the blur pointer image and the display of the normal pointer image.

2. The display system as claimed in claim 1,
wherein the blur pointer image is displayed as a ring sector or as a trapezoid, the normal pointer image is displayed as an acute-angled triangle° and the intermediate pointer image is displayed as a rectangle whose picture coordinates are derived from the coordinates of the sides of the ring sector and of the trapezoid facing each other.

3. The display system as claimed in claim 1,
wherein the display of the intermediate pointer image overlaps neither with the display of the blur pointer image displayed before nor with the following display of the normal pointer image.

\* \* \* \* \*